United States Patent [19]

Sahagen

[11] Patent Number: 5,088,329
[45] Date of Patent: Feb. 18, 1992

[54] PIEZORESISTIVE PRESSURE TRANSDUCER

[76] Inventor: Armen N. Sahagen, 16757 Bolero La., Huntington Beach, Calif. 92649

[21] Appl. No.: 520,262
[22] Filed: May 7, 1990
[51] Int. Cl.$^5$ ............................ G01L 7/08; G01L 9/06
[52] U.S. Cl. ........................................ 73/727; 73/708; 338/4
[58] Field of Search ............... 73/727, 721, 708, 706, 73/754, DIG. 4; 338/4, 3; 29/621.1

[56] References Cited

U.S. PATENT DOCUMENTS 4,127,840  11/1978  House .................................... 338/4
4,600,912   7/1986  Marks et al. .......................... 338/4

Primary Examiner—Donald O. Woodiel
Attorney, Agent, or Firm—Spensley Horn Jubas & Lubitz

[57] ABSTRACT

A piezoresistive pressure transducer employing a sapphire force collector diaphragm having piezoresistive films of silicon epitaxially formed on a major surface thereof, preferably in a Wheatstone bridge pattern. The piezoresistive elements of the Wheatstone bridge are oriented and located so that the pressure sensitivity is maximized, while the linearity errors of the output voltage of the Wheatstone bridge in relationship to the applied pressure are minimized. The silicon piezoresistive film is preferably of a thickness of from 1000 to 60,000 angstroms and is doped with boron in the range of from $5 \times 10^{17}$ to $9 \times 10^{20}$ atoms/cc. Electrical arms and contact pads are also formed on the major surface of the force collector diaphragm. The diaphragm is mounted on a ceramic body having a cavity in the upper surface thereof, the diaphragm enclosing the cavity so as to form a protective chamber with the piezoresistive silicon films within the chamber. The diaphragm is hermetically bonded by the ceramic glass to the body in a vacuum such that the chamber provides a low pressure of vacuum reference. The contact pads are positioned over a matching number of feed through tubes in the ceramic body and electrical connectors are fed through the tubes for carrying electrical signals from the piezoresistive film within the chamber. A protective assembly encloses the pressure transducer thereby insulating it from external shock or pressure. The ceramic body, the sapphire diaphragm and the isolation ring are all of approximately matching thermal expansion characteristics.

25 Claims, 4 Drawing Sheets

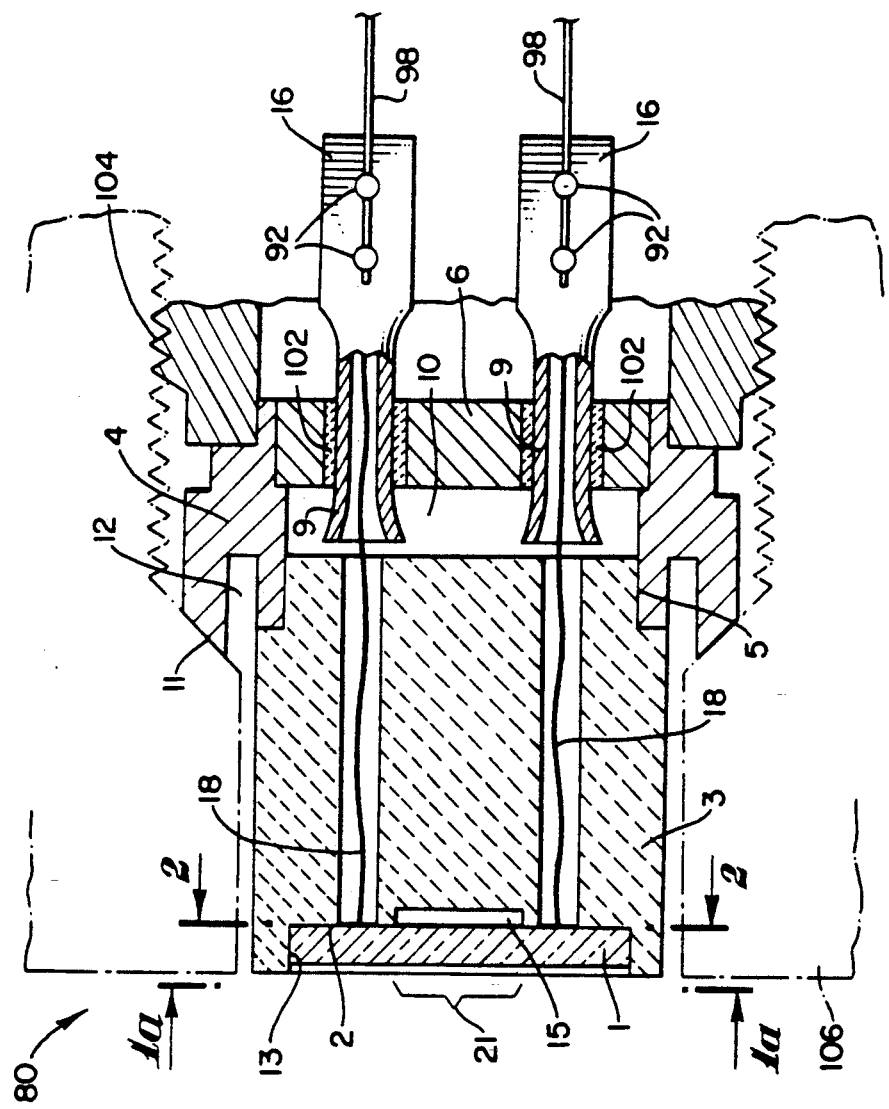
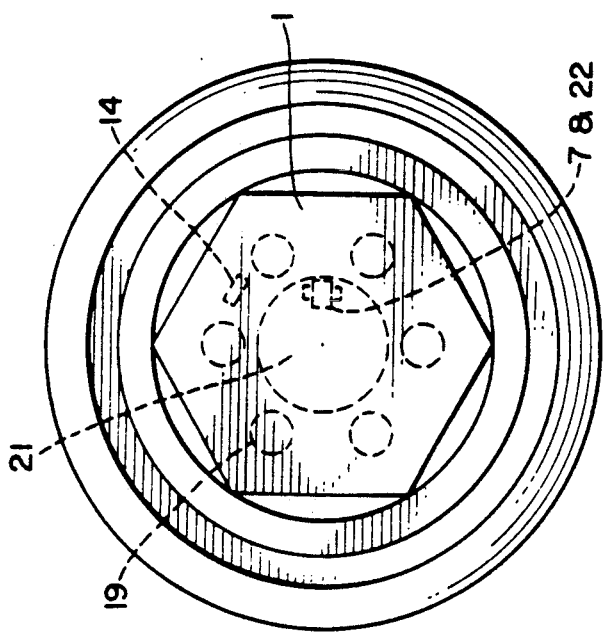

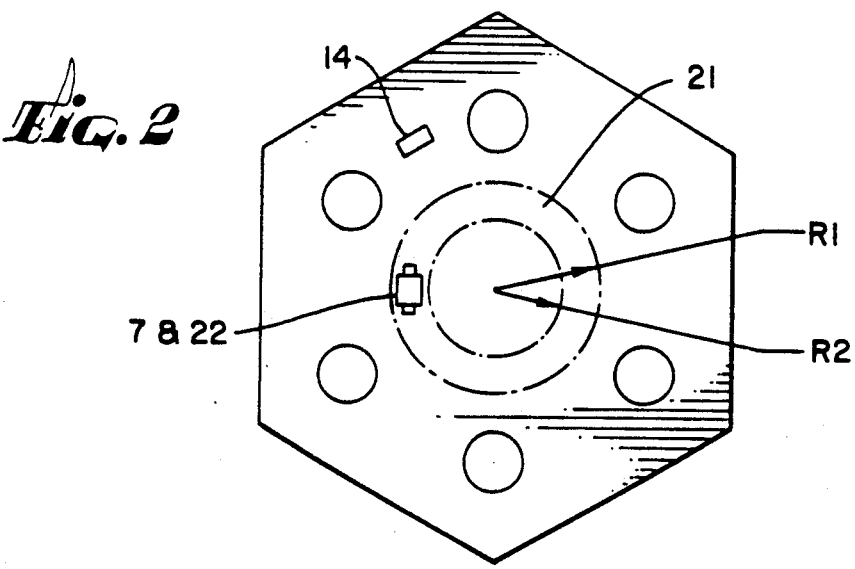
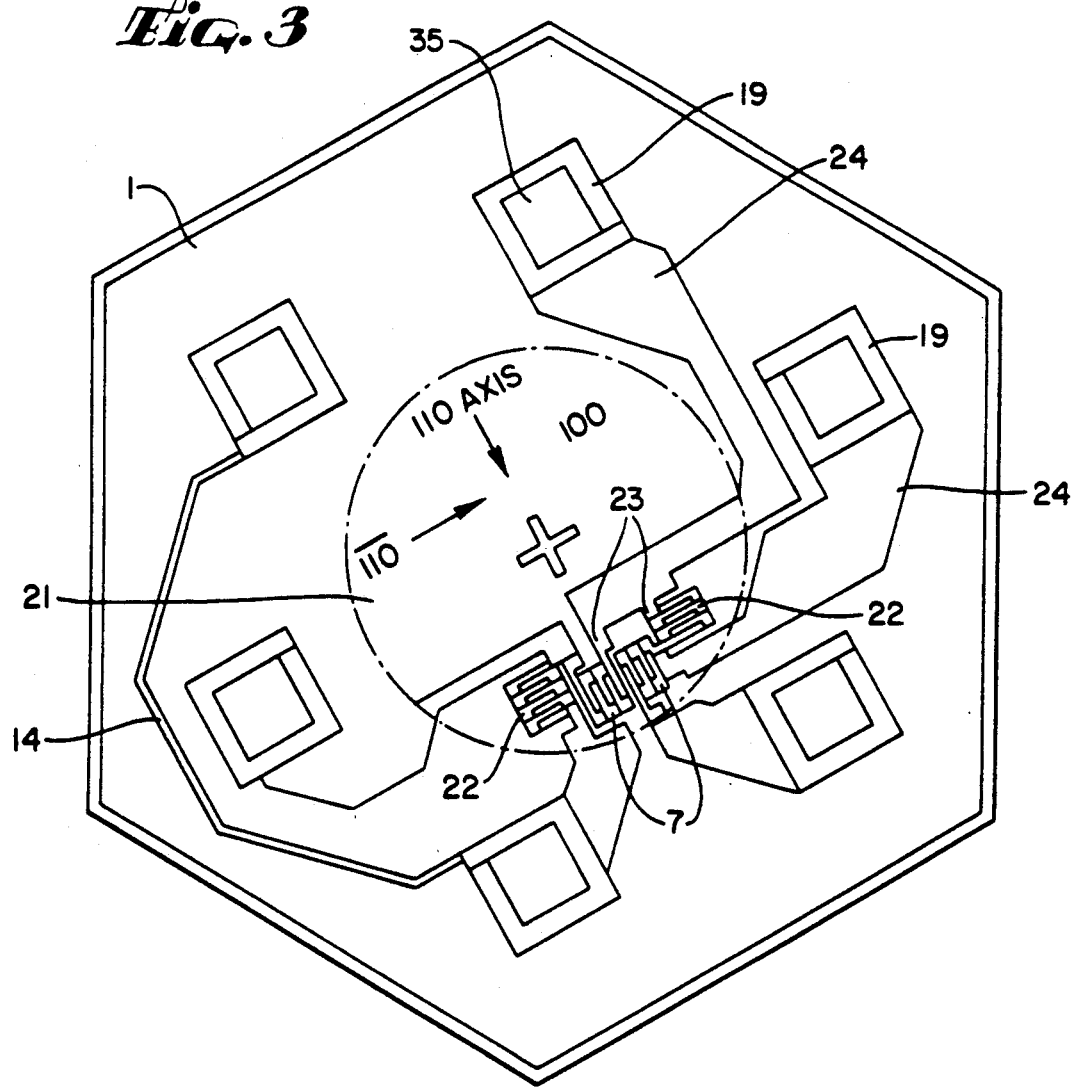

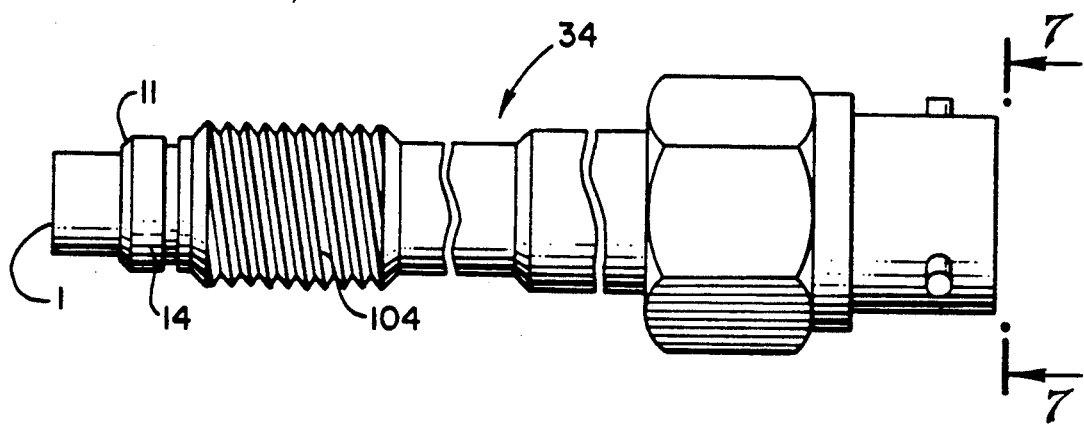
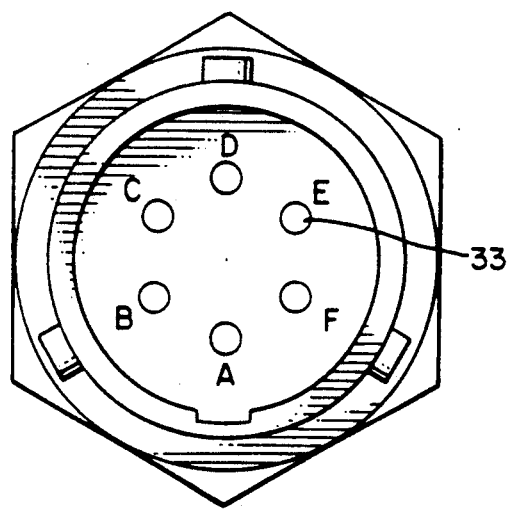
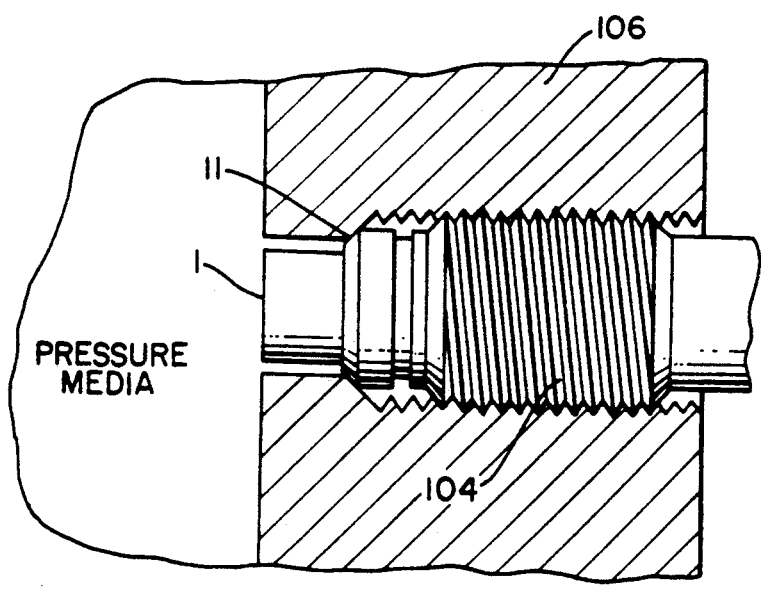

PIEZORESISTIVE PRESSURE TRANSDUCER

BACKGROUND OF THE INVENTION

The present invention relates to pressure sensing transducers. More particularly, the present invention relates to pressure sensing transducers of the piezoresistive type.

Piezoresistive pressure transducers have a wide range of applications in any industry where accurate pressure monitoring is required. Typical industrial applications include process monitoring, rotating machinery monitoring and testing, oil exploration, and jet and gas turbine engine controls. Piezoresistive pressure transducers offer many potential advantages in such applications due to their small size, absence of moving parts and potential for sensitivity and accuracy.

The heart of a piezoresistive pressure transducer is a pressure force collector diaphragm having one or more piezoresistive elements mounted thereon. The diaphragm with the piezoresistive elements is typically placed in a pressure cell of some type which maintains a low pressure or vacuum on one side of the diaphragm and allows the external medium under pressure to contact the other side of the diaphragm. A voltage is placed across the piezoresistive element(s) and as the diaphragm bends in response to pressure changes, a resistance change in the piezoresistive element(s) results in a change in the current flowing through the piezoresistive element(s).

There exists an application in the plastic industry known as the polymer melt process where accurate pressure and temperature measurements are essential to control the process. The pressure and temperature typically reach up to 15,000 psi and to 800° F. and above. The external media being measured is typically a slurry, viscous fluid which has corrosive and abrasive properties and is maintained at high temperatures of up to 800° F. As a result, conventional alloys of steel and stainless steel exposed to such media are readily abraded and degraded.

In order to accurately measure the pressure and temperature of such media, however, the piezoresistive elements need to be in intimate contact with the diaphragm deflected by the media. The various components of the pressure transducer must also be able to withstand the high temperatures associated with the polymer melt process. A flush mount force collecting diaphragm capable of operating under such high temperatures with its pressure and temperature sensing elements integrated on the diaphragm would be ideal. However, to the best of Applicant's knowledge there is no known pressure transducer available in the industry which has components which can withstand the high temperature corrosive materials used in the polymer melt process and can provide accurate pressure and temperature measurements directly. As a result, the industry has attempted to develop other pressure transducers that do not locate the piezoresistive elements on the diaphragm which makes intimate contact with the corrosive and abrasive media.

In one approach, a stainless steel force collector diaphragm of approximately 0.005 inch thickness and 0.320 inch diameter having no pressure or temperature sensing elements mounted thereon is arranged so that it is in intimate contact with the media. This diaphragm is strictly a force collector with no sensing capabilities. The force collected through the diaphragm from the media, due to diaphragm deflection, is transmitted through a tube or a capillary filled with mercury to a conventional pressure transducer positioned a safe distance from the external media.

This approach has several distinct disadvantages. First, the thin stainless steel diaphragm is susceptible to abrasion that gradually alters its pressure sensitivity properties, thereby compromising its measuring accuracy. Second, the abrasion of the diaphragm coupled with its exposure to corrosive media may eventually cause the rupture of the diaphragm. This is obviously an extreme hazard when the diaphragm deflection is transmitted to the pressure transducer through a tube filled with a poisonous fluid such as mercury. The risk of mercury contamination is particularly critical in applications where the medical and food plastic products are being manufactured, such as the extrusion of food for human and animal consumption, such as cereals, dog food, etc. Such systems are also more complicated, costly and inconvenient to assembly. Such systems are also less accurate since they do not permit direct pressure and temperature measurement of the media.

In another approach, the mercury is replaced with liquid sodium potassium. Although this eliminates mercury contamination or poisoning hazards, it introduces an entirely new problem of a creating a fire hazard since liquid sodium potassium will spontaneously ignite upon exposure to air when the diaphragm ruptures.

In still another approach, a stainless steel extended push rod is used to transmit the force collected by a diaphragm having no sensing capabilities to the conventional pressure transducer. This approach eliminates the previous problems associated with the fluid filled tube, but creates a new set of limitations to the pressure transducer. It greatly increases the cost of manufacturing the pressure transducer. Moreover, it compromises the pressure measuring accuracy of the pressure transducer and fails to facilitate any media temperature measurement. Accordingly, there is a present need for a pressure transducer which has piezoresistive sensing elements mounted on a diaphragm which makes intimate physical contact with corrosive and abrasive materials and can accurately measure such materials over wide pressure and temperature ranges.

SUMMARY OF THE INVENTION

The present invention provides an improved piezoresistive pressure transducer suitable for use in pressure monitoring of corrosive and abrasive materials or in a wide variety of other extreme environments including high radiation environments.

The present invention further provides an improved piezoresistive pressure transducer having a novel configuration which protects the piezoresistive elements mounted on the diaphragm and has components and connections that can withstand high temperature corrosive and abrasive semisolid viscous slurry polymer melts or similar substances. The piezoresistive elements of the Wheatstone bridge are oriented and located so that the pressure sensitivity is maximized, while the linearity errors of the output voltage of the Wheatstone bridge in relationship to the applied pressure are minimized.

The present invention further provides a temperature sensing element on the diaphragm for direct temperature measurements of similar application of up to 1000° F. and above. It has the means for accurately measuring pressures and temperatures of media of extremely corrosive nature.

The present invention provides a means of eliminating residual stresses exerted on the force collecting diaphragm when the pressure transducer is threaded into its working position in a wall. It also provides a silicon-on-sapphire diaphragm configured to maximize the pressure sensitivity and minimize the adverse connection effects.

It further provides a means to minimize adverse temperature effects through passive temperature compensation of the piezoresistive pressure sensitive bridge without the necessity for active components, such as diodes, thermistors, balcoes, piezoresistive and other components of like nature.

The present invention provides an improved piezoresistive transducer having a high degree of accuracy through a wide temperature range, including a preferred embodiment having an upper temperature range of 700° F. or higher.

The present invention further provides a improved piezoresistive pressure transducer having a high degree of accuracy through an extremely broad pressure range, including a preferred embodiment having an upper range of about 40,000 psi.

The present invention provides an improved piezoresistive transducer employing a piezoresistive element epitaxially grown or otherwise deposited on a single crystal, or on a polycrystalline sapphire diaphragm. The layer of piezoresistive material is preferably grown on the major surface of the diaphragm so as to form a single integral crystal structure with the sapphire diaphragm. The piezoresistive layer is preferably of a thickness of about 500 angstroms to 60,000 angstroms with a preferred range of 500 to 7,000 angstroms. One preferred piezoresistive material is silicon having an impurity doping of boron in the rang of from $5 \times 10^{17}$ atoms/cc to $2 \times 10^{21}$ atoms/cc. Other preferred piezoresistive materials are various silicites, nichrome and various cermet materials. The deposited piezoresistors are preferably arranged (using standard photolithographic masking and etching techniques) in a Wheatstone bridge configuration with thin conductive arms connecting the piezoresistors to the contact pads on the sapphire diaphragm.

BRIEF DESCRIPTION OF THE DRAWINGS

FIG. 1 is a cross-section through a preferred embodiment of the piezoresistive pressure transducer of the present invention.

FIG. 1a is an end view taken on line 1a—1a of FIG. 1 of the pressure transducer viewed from the pressure media side.

FIG. 2 illustrates a preferred position for the piezoresistive elements of the Wheatstone bridge and the temperature sensing element on the hexagonal shaped diaphragm.

FIG. 3 illustrates the arrangement of the contact pads, the arms, and nodes of the Wheatstone bridge on the cavity side of the diaphragm. It also illustrates the preferred orientation of the piezoresistive elements of the bridge and of the temperature sensing element. It also illustrates the hollow inner section of the pads formed by removing silicon for later deposit of various metal alloys.

FIG. 6 illustrates an embodiment of an overall assembly for the piezoresistive pressure transducer of the present invention.

FIG. 7 is an end view of the overall assembly of the pressure transducer shown on the line 7—7 of FIG. 6.

FIG. 8 illustrates the location of the overall assembly of the piezoresistive pressure transducer with respect to the pressure media being measured.

DETAILED DESCRIPTION OF THE DRAWINGS

Figure 4:
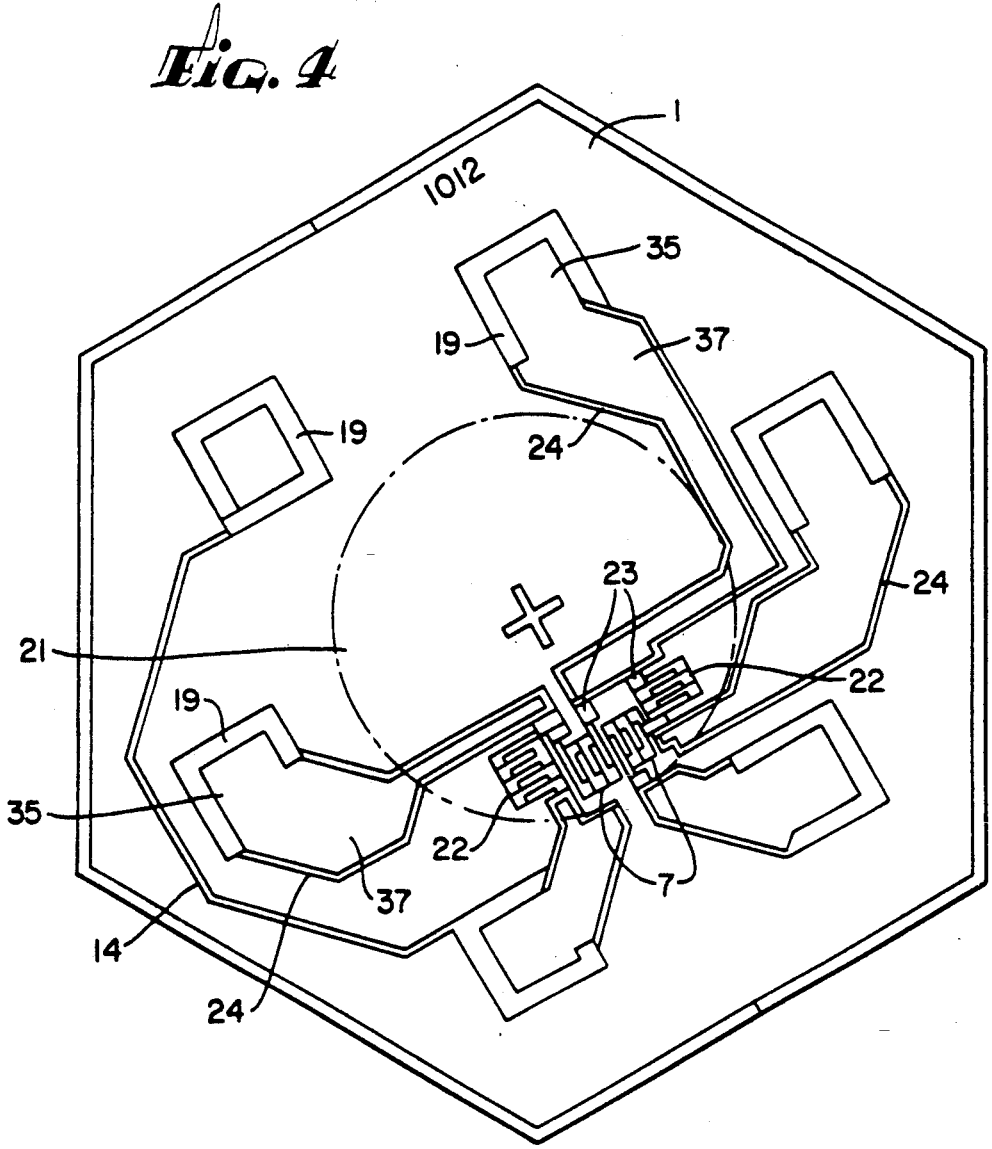
FIG. 4 illustrates the arrangement of the contact pads, the arms and nodes of the Wheatstone bridge on the cavity side of the force collecting diaphragm. It illustrates the orientation of the piezoresistive elements of the bridge and of the temperature sensing element. It also illustrates the hollow inner section of both the contact pads and arms formed by removing silicon for later deposit of various metal alloys.

The following description is the best contemplated mode of carrying out the invention. This description is made for the purpose of illustrating the general principles of the invention and should not be taken in a limiting sense. The scope of the invention is best determined by reference to the appended claims. In the accompanying drawings like numerals designate like parts.

FIG. 1 illustrates a cross-section through a preferred embodiment of a piezoresistive pressure transducer 80. The pressure transducer 80 may be connected to an optional resistor board (not shown). The pressure transducer 80 may be placed within an overall assembly 34 for protection from the environment. The assembly 34 has an overall cylindrical shape as shown in FIG. 6. The cross-section of FIG. 1 also represents a section through the axis of the cylindrical assembly 34. Hexagonal, rectangular or alternate shaped assemblies may also be employed.

The pressure transducer 80 includes a silicon-on-sapphire force collector diaphragm 1 mounted within a recess 13 of a ceramic body 3 by a ceramic glass bond 2. The diaphragm 1 has a first major surface which faces a cavity 15 in the ceramic body 3. As shown in FIGS. 1 and 1a, the unsupported area 21 of the diaphragm 1 will flex into the cavity 15 in response to changes in pressure received by the opposing major surface of the diaphragm 1. As will be described in more detail below, the diaphragm 1 has thin film piezoresistive elements 7 and 22 deposited thereon on the first major surface of the diaphragm 1. The piezoresistive elements 7 and 22 reside within the cavity 15 which protects the piezoresistive elements 7 and 22 from corrosive materials.

An isolation ring 4 is mounted to the ceramic body 3 preferably by a eutectic braze 5. The eutectic braze 5 may be a silver copper alloy having proportions that are approximately eutectic in composition. The isolation ring 4 is welded to a header assembly 6 to form a secondary chamber 10. The header assembly 6 includes a set of isolation tubes 9. Each isolation tube 9 is a hermetically sealed metal feed-through tube lined with glass for electrically isolating an electrical connector 18. Each isolation tube 9 is mounted to the header assembly 6 through a ceramic glass seal 102 capable of handling long-term operating temperatures of about 1000° F. Each isolation tube 9 has an outer end which is not lined with glass to form a flattened pad 16. The flattened pad 16 provides an area to connect output wires 98 by a durable weld 92. The opposite end of the output wires 98 is connected to connectors 33 A-F of the overall assembly of the pressure transducer 80 shown in FIG. 7. The flattened pad 16 also provides hermeticity to the secondary chamber 10. This pressure transducer 80 is capable of handling long-term operating temperatures of about 1000° F. and pressures of about 40,000 psi and above.

As shown in FIGS. 1 and 1a, the electrical connectors 18 connect the contact pads 19 to the flattened pads 16. Each electrical connector 18 is preferably made of gold wire and is welded at one end to contact pad 19. The electrical connector 18 extends through the isolation tube 9. The opposite end of the electrical connector 18 is welded to the flattened pad 16.

Some of the above mentioned advantages are accomplished through the following additional features.

DIAPHRAGM CONSTRUCTION

As shown in FIGS. 1a and 2-4, the force collecting diaphragm 1 is preferably a hexagonal shape or it may be circular, square, or any other shape lending itself to ease of production. The diaphragm 1 is the main component of the pressure transducer 80. The diaphragm 1 is a thin deflectable diaphragm of single or polycrystalline sapphire preferably having a thickness of 0.003 to 0.070 inches. For example, single crystalline sapphire slices of 0.320 inch diameter and having a thickness of 0.013 to 0.050 inches may be used as diaphragms. The sapphire is preferably grown through the Czochralski process in (0001) orientation along the C axis and the epitaxial single crystal piezoresistive layers grown on the first major surface of the diaphragm 1 through conventional processes.

The diaphragm 1 has a first major surface facing the cavity 15 on which are formed piezoresistive elements 7 and 22. The piezoresistive elements 7 and 22 are epitaxially deposited by methods such as chemical vacuum d®position onto the major surface of the sapphire diaphragm 1 so as to form a crystalline extension of the sapphire crystal of diaphragm 1. Polycrystalline piezoresistive silicon may be grown on the first major surface through either, for example, sputtering or chemical vacuum deposition.

The piezoresistive layer is preferably of a thickness of from 500 angstroms to 60,000 angstroms. One preferred piezoresistive material is silicon having an impurity doping of boron in the range of from $5 \times 10^{17}$ to $2 \times 10^{21}$ atoms/cc. Other preferred piezoresistive materials are various silicites, nichrome and various cermet materials.

As shown in FIG. 3, the deposited piezoresistive elements 7 and 22 are preferably arranged (using standard photolithographic masking and etching techniques) in a Wheatstone bridge configuration with thin conductive arms 24 connecting the nodes 23 of the Wheatstone bridge to associated contact pads 19 on the diaphragm 1.

As shown in FIG. 3, a temperature sensing element 14 of the same material and construction as the piezoresistive elements 7 and 22 is positioned in an area of the diaphragm 1 that is supported by the ceramic body 3, that is, the non-stress area of the diaphragm 1. As a result, the temperature sensing element 14 is virtually impervious to pressure changes yet responds to temperature changes in the media in proportion to its resistive changes.

As shown in FIGS. 3-4, a single crystal sapphire is cut along the C axis on a 1012 plane. Single crystalline silicon may be grown on the sapphire diaphragm 1 through the conventional processes described above, preferably on a 1012 plane which yields a silicon layer on the 100 plane. As shown in FIG. 3, a circular unsupported area 21 of the diaphragm 1 may be selected as the force collector, so that when deformed, stresses are exerted in the unsupported area 21 of the diaphragm 1.

When deformed the unsupported circular area 21 of the diaphragm 1 will exert maximum stress along the edge of the cavity 15 where the diaphragm 1 is unsupported by the ceramic body 3 in a direction normal to the edge of the circle. When the silicon crystallographic plane is 100, the maximum stress will be on the 110 axis. This configuration is preferred because the maximum piezoresistive sensitivity of silicon is along the 110 axis on the 100 plane. Therefore, if the piezoresistive elements 7 are placed along this axis, the exerted stresses on the diaphragm 1 will result in a maximum positive change in resistance. However, if the other piezoresistive elements 22 are placed perpendicular to the 110 axis, an equal and opposing negative resistance change will result in proportion to the exerted stresses on the diaphragm 1. The present invention takes advantage of this phenomena by providing a four arm Wheatstone bridge as shown in FIG. 3. As a result, all outputs of the four arm Wheatstone bridge become additive with some self-compensating temperature effects.

Still another aspect of this invention is to locate the piezoresistive elements 7 and 22 of the Wheatstone bridge in a certain region of the unsupported area 21 of the diaphragm 1. As shown in FIG. 2, this area is defined by an outer radius R1 and an inner radius R2. The outer radius R1 coincides with the edge of the cavity 15 of the ceramic body 3 where the diaphragm 1 becomes unsupported. It can be shown through stress analysis that there exists a region within the area defined by the inner radius R2 where the deflection of the diaphragm 1 generates zero stresses. In order to avoid the zero stress region the piezoresistive elements 7 and 22 must be located between the outer radius R1 and the inner radius R2. The inner radius R2 is preferably approximately 0.66R1. This location ensures a relatively uniform stress distribution on the piezoresistive elements 7 and 22. As a result, the linearity errors of the output voltage of the Wheatstone bridge in relationship to the applied pressure are minimized.

Another aspect of this invention is to provide arms 24 to connect the nodes 23 of the Wheatstone bridge to the pads 19. In this manner, the electrical connectors 18 can be welded or bonded to the pads 19 in a durable manner without adversely affecting the piezoresistive measuring and accuracy capability.

As shown in FIG. 3, a preferred approach is to extend the epitaxially deposited silicon used for the piezoresistive elements, 7 and 22 for the arms 24 as well. The arms 24 will have a similar composition to the piezoresistive element 7 except electrical resistivity will be reduced considerably by increased boron doping of the arms 24 or by minimizing the squares of each arm 24 by increasing its width. The arms 24 may also be partially positioned along a 45° angle to the 110 axis. Such crystallographic axes of silicon are not pressure sensitive. Therefore, the resistive value of the arms 24 remain unaltered due to the flexing of the unsupported area 21 of the diaphragm 1. This overall approach is desirable since the advantage of atomic bonding of silicon to sapphire will also be extended to the arms 24.

However, this introduces another disadvantage with respect to the bonding of the electrical connectors 18 to the pad 19. As mentioned earlier, a preferred wire for the electrical connectors 18 is gold, aluminum or platinum. However, welding the electrical connectors 18 to the pads 19 will greatly lower the melting temperature of the connection because of the formation of a eutectic composition. This will also drastically increase the temperature coefficient of expansion. For example, a gold silicon eutectic alloy formed by the welding of lead 18 to pad 19 will melt at approximately 420° C. This sharply contrasts with the independent melting points of silicon and gold which both exceed 1000° C. Of course, this introduces appreciable limitations in measuring manufacturing processes of higher than 420° C.

As shown in FIG. 3, the present invention alleviates this problem by removing the silicon from the inner section 35 of the pads 19 and depositing other selective metals to perform the task. One preferred embodiment is depositing, through conventional means, a combination of titanium and tungsten alloy. A preferred composition would be approximately 15% titanium and 85% tungsten by weight. Titanium, independently or in an alloy with any other metal, has excellent adhesion affinity to sapphire. Pure tungsten possesses desirable electrical and temperature coefficient of resistance properties.

In order to facilitate the welding or bonding of the electrical connector 18 to the pad 19, an additional metal layer is then deposited on the titanium tungsten alloy layer. A preferred additional layer is platinum, however, silver, nickel or other alloys are also suitable.

As shown in FIG. 4, the silicon or other material may also be removed from the inner sections 37 of the arms 24 extending from the inner sections 35 of the pads 19 to the nodes 23 of the Wheatstone bridge. Similar material can then be deposited in the inner sections 37 of the arms 24 as that deposited in the inner sections 35 of the pads 19. This will have the advantage of lowering the electrical resistivity of the arms 24. However, the atomic bonding feature of silicon on sapphire of the arms 24 may be compromised.

Although the preferred alloy of titanium tungsten for pads 19 and/or arms 24 is desirable, other alloys will also function appropriately. For example, pure titanium, pure tungsten, pure molybdenum, or a combination of these metals, or a combination of any other high temperature alloys such as vanadium or nickel with titanium for adhesion can be used. Aluminum may also be deposited in the inner sections 35 and 37, of the pads 19 and arms 24, respectively. However, the resistance welding of the electrical connectors 18 to the pads 19 will be somewhat compromised because the preferred gold wire is not readily weldable to aluminum. It should be mentioned that the electrical connector 18 may also be platinum, nickel or copper.

As shown in FIG. 3, piezoresistive elements 7 and 22 may also be further protected from a hostile environment by depositing additional layers of materials tailored for such purposes. Such protective layers will also further enhance the measurement accuracies and stabilities. Some preferred layers are silicon dioxide, silicon nitride, borosilicate glass and aluminosilicate glass by themselves or in combination. Such layers may be deposited through conventional processes such as sputtering, evaporation or plasma enhanced chemical vapor deposition. A preferred thickness for the layers is from 200 angstroms to 10 microns.

BRIDGE TEMPERATURE COMPENSATION

The output of the piezoresistive Wheatstone bridge and its zero offset initial reading are highly temperature sensitive. Therefore, the pressure transducer accuracy is affected by temperature changes. Conventional pressure transducers operating in temperature of up to 300° F. are compensated for temperature errors through the use of active electronic components, such as thermistors, balcoes, diodes, transistors or integrated circuits. However, at this time, none of these components are capable of operating at temperatures of 1000° F. or above.

Figure 5:
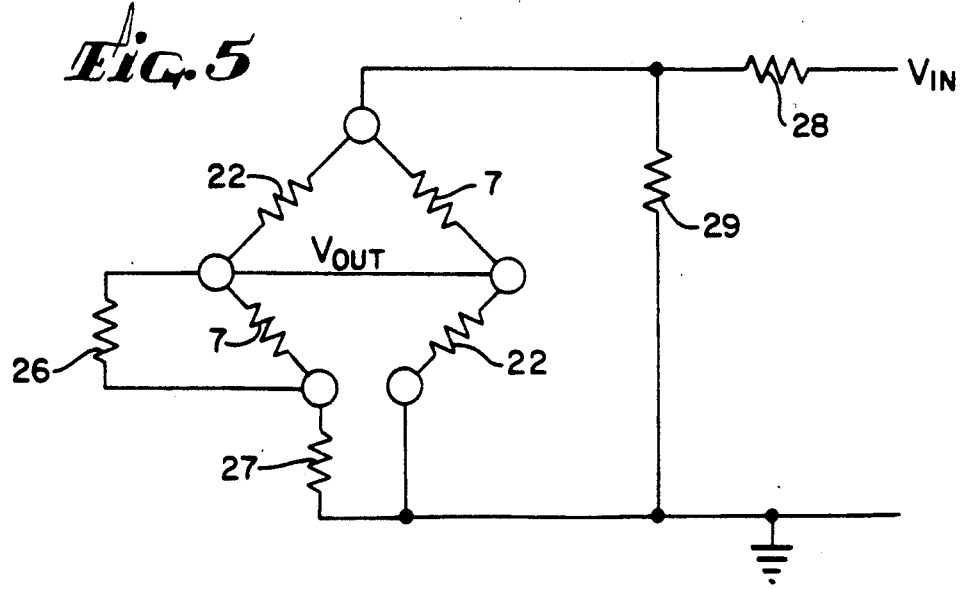
FIG. 5 illustrates the configuration of the Wheatstone bridge and the locations of the temperature compensating resistors.

The present invention uses only high temperature resistors having nearly zero temperature coefficients of resistance to compensate for the adverse temperature affects occurring at temperatures of up to 1000° F. and above. As shown in FIG. 5, it compensates for temperature error by adding a resistor 26 in parallel and a resistor 27 in series to the associated piezoresistive element 7. The resistor 26 and 27 have substantially zero temperature coefficient of resistances. It can be shown through known techniques of circuit analysis that a proper combination of resistors 26 and 27 may be used to minimize the temperature errors at zero pressure.

Similarly, a combination of resistors 28 and 29 having substantially zero temperature coefficients of resistance may be selected to compensate for temperature error at varying pressure. The latter output temperature compensation is known as span compensation. Such temperature compensating resistors 26, 27, 28 and 29 may be located on the surface of the diaphragm 1 or located external to the diaphragm 1 within the assembly 34 of the pressure transducer 80 shown in FIG. 6.

BONDING OF DIAPHRAGM TO CERAMIC BODY

This is accomplished through a devitrifying ceramic glass 2 which is applied to the diaphragm 1 and ceramic body 3 on appropriate areas through conventional techniques such as by silk screening or by doctor blading. After application of the ceramic glass 2 to the proper areas of the diaphragm 1 and the ceramic body 3 and a drying cycle, the ceramic glass 2 is sealed at temperatures of between typically 400° C. to 600° C. At these temperatures, the ceramic glass 2 goes through a nucleation and a transformation stage and becomes a solid substance that, unlike glass, will not become plastic as temperature increases and will not melt at temperatures of up to 2000° F. Through the selection of appropriate compositions, different temperature coefficient of expansion can be obtained to match that of the diaphragm 1 and the ceramic body 3. Matching the temperature coefficient of expansion of these parts is essential in order to eliminate microscopic cracks from consecutive heating and cooling cycles that occur during applications. The preferred range of temperature coefficient of expansion is between $3 \times 10^{-6}$ to $11 \times 10^{-6}$ /° F. Some ceramic glass compounds are commercially available from Corning Glass and other sources. One such example is Corning Glass No. 7578.

CERAMIC BODY

The temperature coefficient of expansion of the ceramic body 3 must match that of the ceramic glass 2, the sapphire diaphragm 1 and isolation ring 4 in order to measure high temperatures of up to 1000° F. and above and pressures of up to 20,000 psi and above. The ceramic body 3 must also provide electrical isolation for electrical connectors 18. An suitable selection is $Al_2O_3$, that is alumina, which is basically the same as sapphire in composition, except that it is non-crystalline and is amorphous. However, preferred ceramic body 3 is one which has all the following advantages: improved heat conductivity to minimize temperature response time; high dielectric constant; non-porous; good adhesion properties for glass ceramic and brazing sealing; and corrosion and abrasion endurance against corrosive environments and abrasive compounds typically encountered in polymer, plastic, food and other industries. Some preferred ceramic compounds are $Al_2O_3$, better known as alumina; BEO brylium oxide, better known as brylua; Silicon nitride; Silicon carbide compounds; BEO and $Al_2O_3$, brylua and alumina, better known as chrysoberyl; MgO and $Al_2O_3$ compounds, better known as spinel; Zerconium oxide and aluminum oxide systems, better known as zerconia alumina; $SIO_2$ and aluminum compounds, better known as andalusite or silliminite; Silicon nitrate and aluminum oxide compounds; and any other metal oxide compound or combination compound suitable for ceramics processing having a temperature coefficient of expansion of about $4\times10^{-6}$ to $11\times10^{-6}/°$ F. with high electrical insulation properties and an optimized thermal conductivity of from 0.020 to 0.700 calories/cm²/cm/sec/C.

ISOLATION RING

The isolation ring 4 provides a set of threads 104 to connect the ceramic body 3 including the diaphragm 1 to a wall 106 or to a part of the protective assembly 34. The isolation ring 4 also has a pressure sealing surface 11 which functions to seal the pressure media off from the atmosphere when the protective assembly 34 of the pressure transducer 80 is inserted into the wall 106.

As shown in FIG. 1, when the pressure transducer 80 is threaded into wall 106, some of the force applied to sealing surface 11 will be transferred to the diaphragm 1 through the ceramic body 3. This will exert undesired residual stresses to the piezoresistive elements 7 and 22, thereby adversely affecting the measuring accuracy of pressure transducer 80. Such residual stresses are minimized through an isolation slot 12 which virtually eliminates or minimizes these residual stresses.

As the pressure transducer goes through extreme temperature changes, additional residual stresses may be exerted upon the diaphragm 1 if the temperature coefficient of expansion of all the parts of the pressure sensor assembly 80 are not closely matched. The isolation ring 4 should preferably have temperature coefficient of expansion of about $4\times10^{-6}$ to $11\times10^{-6}/°$ F. to match that of the ceramic body 3. The isolation ring 4 must also be brazable, weldable, and corrosion resistant and have high compressive and tensile strength. Commercially available nickel iron alloys with small impurities have such advantages.

A preferred choice for the isolation ring 4 is NILO-36 of primarily 36% nickel and 64% iron with a temperature coefficient of expansion of $4.7\times10^{-6}/°$ F. at 750° F., or NILO-42 of primarily 42% nickel and 58% iron with a temperature coefficient of expansion of $3.4\times10^{-6}/°$ F. Such nickel iron alloys are available commercially under the trade names NILCO, INVAR and KOVAR. Other preferred choices are INCONEL-718 having a composition of 51% nickel, 20% chromium, 5% molybonium, 5% niobium and a temperature coefficient of expansion of about 6.5 to $7.3\times10^{-6}/°$ F.

at up to about 1000° F. Such an alloy is available commercially under the trade name INCONEL-718. Other preferred alloy systems are approximately 44% nickel, 49% cobalt and other impurities with a temperature coefficient of expansion of approximately $6\times10^{-6}/°$ F. at 600° F. This alloy has a constant modulus of stiffness and it is commercially available under the trade name C-SPAN ALLOY 902.

I claim:

1. A piezoresistive pressure transducer for monitoring a fluid pressure, comprising:
   a ceramic body having a cavity in the upper surface thereof;
   a crystalline sapphire force collector diaphragm having first and second major surfaces, bonded on the ceramic body over the cavity, so that the first major surface faces toward the upper surface of the ceramic body and the second major surface faces toward the fluid being monitored so that the pressure of the fluid is applied in a direction that causes an unsupported portion of the diaphragm over the cavity to flex into the cavity of the ceramic body; and
   a thin layer of piezoresistive material on the first major surface of the diaphragm, a first portion of the piezoresistive material forming at least one piezoresistive element located in an area of the diaphragm defined by an outer radius R2 and an inner radius R1, wherein R2 coincides with the edge of the cavity where the diaphragm becomes unsupported by the ceramic body and R1 is about 0.66R2.

2. The piezoresistive pressure transducer of claim 1, wherein the diaphragm is mounted within a recess formed in the upper surface of the ceramic body.

3. The piezoresistive pressure transducer of claim 1, wherein the ceramic body is made of a material selected from a group consisting of alumina, brylua, silicon nitride, silicon carbide compounds, chrysoberyl, spinel, zerconia alumina, andalusite, silicon nitrate and aluminum oxide compounds, and any other metal oxide having a temperature coefficient of expansion of about $4\times10^{-6}$ to about $11\times10^{-6}/°$ F., electrical insulation properties and a thermal conductivity of about 0.020 to 0.700 calories/cm.sec.C.

4. The piezoresistive pressure transducer of claim 1, wherein the diaphragm is bonded to the ceramic body with devitrified ceramic glass.

5. The piezoresistive pressure transducer of claim 4, wherein the ceramic glass has a temperature coefficient of expansion from about $3\times10^{-6}$ to about $11\times10^{-6}/°$ F.

6. The piezoresistive pressure transducer of claim 1, wherein the piezoresistive material layer is selected from a group consisting of silicon, silicites, nichrome, and various cermets.

7. The piezoresistive pressure transducer of claim 1, wherein a second portion of the piezoresistive material extends from the piezoresistive element to form a contact pad and a conductive arm, the conductive arm connecting the contact pad to the piezoresistive element.

8. The piezoresistive pressure transducer of claim 7, wherein the contact pad has an inner section of deposited metals selected from the group consisting of titanium, tungsten, molybendum, titanium and tungsten, titanium and molybendum, approximately 15% titanium and 85% tungsten by weight, vanadium, nickel and titanium, aluminum, and zeronium.

9. The piezoresistive pressure transducer of claim 8, further comprising a weldable metal layer on the deposited metal.

10. The piezoresistive pressure transducer of claim 7, wherein the conductive arm has an inner section of deposited metals selected from the group consisting of titanium, tungsten, molybendum, titanium and tungsten, titanium and molybendum, approximately 15% titanium and 85% tungsten by weight, vanadium, nickel and titanium, aluminum, and zeronium.

11. The piezoresistive pressure transducer of claim 7, wherein at least part of the conductive arm is aligned along a 45° angle to the 110 axis of the piezoresistive material.

12. The piezoresistive pressure transducer of claim 7, wherein the conductive arm has more P-type dopant than the piezoresistive element to reduce the electrical resistivity of the arm.

13. The piezoresistive pressure transducer of claim 1, wherein a protective layer is disposed on the piezoresistive material, the protective layer selected from the group consisting of silicon dioxide, silicon nitride, borosilicate glass, and aluminosilicate glass or a combination thereof.

14. The piezoresistive pressure transducer of claim 13, wherein the protective layer is from about 200 angstroms to 10 microns.

15. The piezoresistive pressure transducer of claim 1, further comprising a temperature sensing element located on a portion of the diaphragm that is supported by the ceramic body.

16. The piezoresistive pressure transducer of claim 1, further comprising a temperature compensating means for minimizing temperature error at zero pressure, wherein the temperature compensating means includes a resistor connected to the piezoresistive element.

17. The piezoresistive pressure transducer of claim 16, wherein the resistor is a high temperature resistor having about a zero temperature coefficient of resistance and is connected in series to the piezoresistive element.

18. The piezoresistive pressure transducer of claim 16, wherein the resistor is a high temperature resistor having about a zero temperature coefficient of resistance and is connected in parallel to the piezoresistive element.

19. The piezoresistive pressure transducer of claim 1, further comprising a span compensation means for minimizing the temperature error at varying pressure, wherein the span compensation means includes a resistor connected across the piezoresistive element.

20. The piezoresistive pressure transducer of claim 19, wherein the resistor is a high temperature resistor having about a zero temperature coefficient of resistance.

21. The piezoresistive pressure transducer of claim 1, further comprising a hollow isolation ring having an inner and an outer surface defining an isolation slot for minimizing the residual stresses on the diaphragm, disposed concentrically around the ceramic body, the inner surface of the isolation ring mounted to the ceramic body and the outer surface having a beveled pressure sealing surface.

22. The piezoresistive pressure transducer of claim 21, wherein the isolation ring has a temperature coefficient of expansion of about $4 \times 10^{-6}$ to $11 \times 10^{-6}/°$ F.

23. The piezoresistive pressure transducer of claim 21, wherein the isolation ring is selected from a group of metal alloys consisting of 36% nickel and 64% iron by weight, 42% nickel and 58% iron by weight, 51% nickel and 20% chromium and 5% molybonium and 5% niobium, and 44% nickel and 46% cobalt.

24. The piezoresistive pressure transducer of claim 21, wherein the isolation ring is bonded to the ceramic body by a silver copper alloy of approximately eutectic proportions.

25. The piezoresistive pressure transducer of claim 1, further comprising an electrical connector attached to the contact pad, the electrical connector selected from the group consisting of gold, aluminum, and platinum.

* * * * *